United States Patent [19]

Ruffner

[11] 3,943,633
[45] Mar. 16, 1976

[54] PROBE FOR A GEAR TESTER
[75] Inventor: Heinz Ruffner, Langnau, Switzerland
[73] Assignee: Maag-Gear Wheel & Machine Company Limited, Zurich, Switzerland
[22] Filed: Sept. 13, 1974
[21] Appl. No.: 505,907

[30] Foreign Application Priority Data
Sept. 14, 1973 Switzerland.................. 13253/73

[52] U.S. Cl. ..................... 33/179.5 R; 33/174 L
[51] Int. Cl.²............................................ G01B 7/02
[58] Field of Search........ 33/174 L, 174 P, 179.5 R, 33/172 E, 172 R, 179.5 C, 179.5 D

[56] References Cited
UNITED STATES PATENTS
| | | | |
|---|---|---|---|
| 2,657,468 | 11/1953 | Lyons.............................. | 33/174 L |
| 2,900,733 | 8/1959 | Zelnick........................... | 33/172 |
| 3,292,604 | 12/1966 | Riffe............................... | 74/567 |

FOREIGN PATENTS OR APPLICATIONS
| | | |
|---|---|---|
| 1,920,551 | 12/1965 | Germany |
| 1,210,574 | 2/1966 | Germany |

OTHER PUBLICATIONS
Feingerätetechnik 14th Year, Part 3/1965, pp. 105–107.

*Primary Examiner*—Richard E. Aegerter
*Assistant Examiner*—Michael H. Thaler
*Attorney, Agent, or Firm*—Toren, McGeady and Stanger

[57] ABSTRACT

A feeler device has a feeler element pivoted on a carrier for measurement of relative movements between the element and carrier. The element can be located in alternative end positions from which the relative movements take place. The end position is selected by adjustment of a rotatable ring that has a camming surface acting on springs which provide the biassing action that causes one or other end position to be assumed.

8 Claims, 2 Drawing Figures

PROBE FOR A GEAR TESTER

BACKGROUND OF THE INVENTION

The invention relates to a feeler device, particularly but not exclusively for testing the flanks of gear teeth.

In a known feeler device for gear tooth flanks, the feeler pressure can be so changed over by a helical spring that it is possible at will to apply the device to a left-hand or a right-hand tooth flank. In making this change, due to the different stressing of the helical spring, depending on a winding or unwinding movement, differences in torque and thus in force occur with equal plus or minus angles of rotation.

The invention has for its object to provide a device in which the feeler pressure for left-hand and right-hand tooth flanks can be given the same value with equally large symmetrical deviation angles of the change-over member.

SUMMARY OF THE INVENTION

This object is achieved in the present invention by providing a displaceable member for biasing the device in a predetermined direction of deflection, the displaceable member being arranged to act on respective springs, in dependence upon its position of adjustment which urges the device into one or another alternative end position.

The displaceable member is preferably in the form of a rotatable ring and may be provided with an abutment surface providing a camming action to vary the setting of said springs. Such an abutment surface may take the form of an inclined plane on an end face of the ring and set obliquely to the direction of rotation of the ring.

BRIEF DESCRIPTION OF THE DRAWINGS

An embodiment of the invention will be described, by way of example, with reference to the accompanying drawing, wherein.

DESCRIPTION OF A PREFERRED EMBODIMENT

Figure 1:
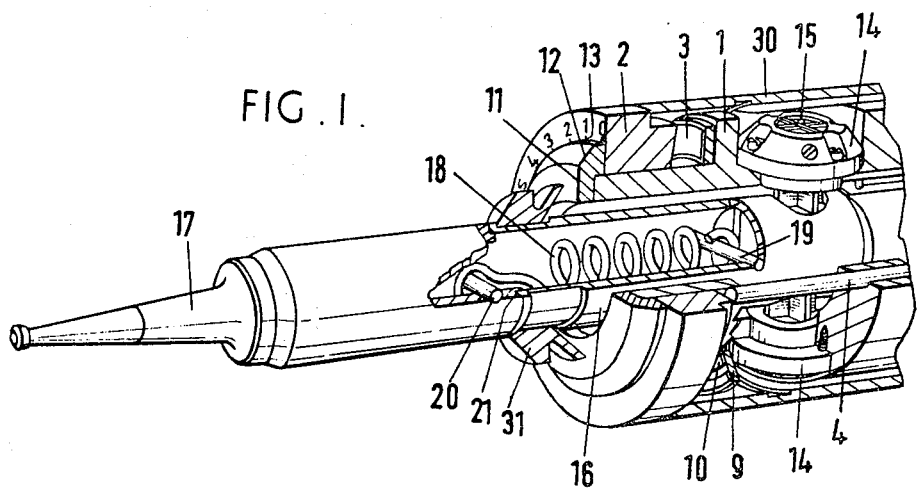
FIG. 1 is a perspective view of the front portion of a feeler device according to the invention.
Figure 2:
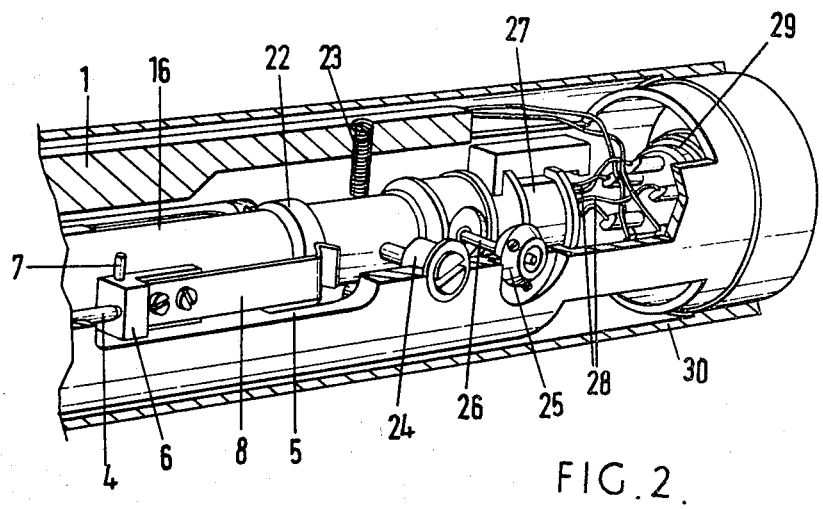
FIG. 2 is a similar perspective view of the rear portion of the same device.

Referring to the drawing, the device comprises an elongated tubular carrier member 1 on which various elements of the device are mounted. These include a ring 2 that is rotatable on the forward end of the carrier member and has an inclined rear end face 3 obliquely inclined to its axis of rotation. The carrier member also supports two longitudinally extending pins 4 disposed symmetrically on opposite sides of the member 1. Slots 5 are provided on opposite sides of the carrier member 1, and in each slot is arranged a bell crank lever 6 mounted on the member 1 by pins 7. A leaf spring 8 is fixed by one end to each bell crank lever 6. A disc 9 on which contact segments 10 are arranged is also secured on the carrier member 1.

In front of the rotatable ring 2 there is fixed a disc 11, which carries a fiducial mark 12. A symmetrical scale 13 on the rotatable ring 2 co-operates with the mark 12.

Fixed in the base member 1 are two diametrically opposed flanges or mounting discs 14, in which are set two leaf spring 15 arranged perpendicular to one another. The central zone of these two leaf springs 15 passes through a cross bore in a lever or rod 16 extending centrally along the member 4, the lever thus being pivotable in a certain direction of deflection (in the horizontal plane as seen in the drawing). One end of the lever or rod projects forwards of the member 1 and carries a feeler probe 17 held in place by a tension spring 18 with pins 19 and 20. The form of interconnection permits articulation between the probe and the rod if there is an excessive side loading on the probe that cannot be taken up by deflection of the rod, the probe then pivoting on a side edge of the interface 21 between it and the rod, but the probe and rod normally move together.

Towards the rear of the rod 16 there is a collar 22 against which lateral pressure is applied by the leaf springs 8.

Screws 23 which are disposed on opposite sides of the rod 16 in the vertical plane and are arranged in the member 1 with some clearance from the rod, prevent the rod being tilted in the vertical plane. Spring stops 24, fixed in the base member 1, prevent excessive horizontal deflections of the rod 16 and also take up horizontal impacts of the rod.

Disposed in two diametrically opposed flanges or supports 25 set into the member 1 is a measuring pin 26, which establishes the horizontal position of the bar 16 by induction, the associated electric or electronic measuring elements being arranged in a housing 27. Connecting wires 28 lead from the housing to a plug socket 29 fixed in the rear of the member 1. A sleeve 30 encloses the mechanism from the rear of the member 1 to the ring 2 and a packing 31 protects it from dust.

When gear tooth flanks are to be tested by means of the device, then it is normally clamped in a suitable testing machine by the exterior surface of the sleeve 30 and the probe 17 is brought into contact with the chosen tooth flank. If it is the left-hand tooth flank which is concerned, then the rotatable ring 2 is set beforehand according to the scale 13 and the mark 12 for "left" to a specified bias. After a turning movement of the ring 2, the inclined end face 3 acting on the two pins 4 forces each one to a greater or lesser degree, corresponding to the preselected bias characterised by a number on the scale 13, against the bell crank lever 6 whereby the springs 8 are urged against the rod 16 with different pressures and deflect the rod about the springs 15 to one side in the horizontal plane. As a consequence, when pivoted to a maximum the rod comes to an end position against one or other of the spring stops 24.

If now the tooth flank to be tested presses in the opposite direction against the probe 17, then the feeler rod 16 experiences a pivotal movement in the horizontal plane back towards its central position or beyond and against the force of that one of the springs 8 biassing it from that position. The setting taken up by the rod is sensed and transmitted by the measuring pin 26 and the measuring elements in the housing 27 and the resulting electrical signals are emitted through the connecting wires 28 and the plug socket 29 to external indicating instruments or recording means. The contact segments 10 produce as a function the direction of rotation of diagram paper according to the left-hand flank, if the recording means are provided in diagram form.

If the right-hand tooth flank is to be tested, a similar procedure is used, the opposite one of the two pins 4 now being urged rearwards by rotational adjustment of the ring 2 to cause its associated spring 8 to pivot the rod 16 into the other end position.

It is also possible to employ similarly acting cams instead of an oblique face on the rotatable ring 2, which cams, arranged symmetrically, urge the pins 4 against the bell crank levers 6 and thus against the springs 8, according to the rotational setting of the ring.

The feeler device is not only capable of being used for testing tooth flanks, but can also be employed for other services in which the deflection of a feeler element has to take place in a specific direction.

What I claim and desire to secure by Letters Patent is:

1. A feeler device comprising, in combination, an elongated probe element, a carrier for carrying said element, mounting means supporting said element on said carrier in a manner permitting relative movement between said probe element and said carrier, means for sensing said relative movement, said mounting means comprising a first spring means and a second spring means each extending parallel to the length of said probe element and acting on said probe in opposition to each other, a control member supported on said carrier and adjustable in either of two rotatable directions, a first connecting element and a second connecting element each extending parallel to the length of said probe element and disposed between said control member and said first and second spring means, respectively, whereby each of said first and second spring means is connected to said control member by a respective said connecting element, the adjustment of said control member on the carrier displacing said first and second connecting elements in opposite directions to each other in order to increase the biasing action of a selected one of said spring means on the probe element, said probe element being urged towards alternative end positions in dependence upon the adjustment of said control member and with a force that increases in dependence upon the extent of said adjustment of said control member from a central neutral position.

2. The feeler device according to claim 1, wherein said control member comprises an abutment surface and said connecting elements are urged by said spring means against said surface, said surface providing a camming action with said adjustment of the control member thereby varying the stored energy in the spring means and bringing the probe element to the selected one of said end positions.

3. The feeler device according to claim 2, wherein each of said first and second connecting elements comprise a pin having one end connected to a respective spring means, and the other end in contact with said abutment surface, said carrier member comprising a first slot and a second slot for receiving said first and said second connecting elements, respectively, said first connecting element positioned diametrically opposite to said second connecting element relative to said control member.

4. The feeler device according to claim 3, wherein each of said spring means comprises a leaf spring having a first end connected to a respective one of said connecting elements and a second end in contact with said probe element, said probe element having a collar surrounding a portion thereof for providing the contact with said spring means.

5. The feeler device according to claim 4, wherein said first end of each of said leaf springs is pivotable about a pivot lying at right angles to the length of the spring means, so that each said leaf spring may pivot in response to the force applied thereto by said control member via said connecting elements.

6. The feeler device according to claim 1, wherein said control member comprises a scale, said scale being symmetrical in the two directions of rotation of said control member for setting the respective opposite end positions of said probe element.

7. The feeler device according to claim 1, wherein said carrier comprises a first and a second screw means lying on diametrically opposite sides of said probe element, each of said screw means extending from said carrier toward said probe element so as to limit the vertical movement of said probe element with respect to said carrier, said screw means lying in a diametrical plane of said probe element at right angles to the diametrical plane of said first and second connecting elements.

8. The feeler device according to claim 7, wherein said carrier further comprises a first stop and a second stop lying on diametrically opposite sides of said probe element in the same diametrical plane as the connecting elements, whereby the horizontal movement of said probe element with respect to said carrier is limited.

* * * * *